(12) United States Patent
Soga et al.

(10) Patent No.: US 10,847,328 B2
(45) Date of Patent: Nov. 24, 2020

(54) SWITCH

(71) Applicant: Kabushiki Kaisha T AN T, Saitama (JP)

(72) Inventors: Hisashi Soga, Saitama (JP); Hiroshi Ochiai, Saitama (JP)

(73) Assignee: Kabushiki Kaisha T AN T, Saitama (JP)

( * ) Notice: Subject to any disclaimer, the term of this patent is extended or adjusted under 35 U.S.C. 154(b) by 351 days.

(21) Appl. No.: 15/751,796

(22) PCT Filed: Oct. 5, 2017

(86) PCT No.: PCT/JP2017/036225
§ 371 (c)(1),
(2) Date: Feb. 9, 2018

(87) PCT Pub. No.: WO2018/220877
PCT Pub. Date: Dec. 6, 2018

(65) Prior Publication Data
US 2020/0219680 A1 Jul. 9, 2020

(30) Foreign Application Priority Data

May 30, 2017 (JP) .................................. 2017-106586

(51) Int. Cl.
*H01H 13/06* (2006.01)
*H01H 3/12* (2006.01)

(52) U.S. Cl.
CPC .............. *H01H 13/06* (2013.01); *H01H 3/12* (2013.01)

(58) Field of Classification Search
CPC ................................. H01H 13/06; H01H 3/12
(Continued)

(56) References Cited

U.S. PATENT DOCUMENTS 6,396,013 B1 * 5/2002 Kondo ................... H01H 13/06
200/302.3
2005/0029085 A1 * 2/2005 Dozono ................. H01H 13/06
200/520
(Continued)

FOREIGN PATENT DOCUMENTS

DE       102005014563 A1     9/2006
JP           S55-36283 U      3/1980
(Continued)

OTHER PUBLICATIONS

Office Action issued in Chinese Application No. 201780003420.7, dated May 28, 2019 with English translation (10 pages).
(Continued)

*Primary Examiner* — Nguyen Tran
*Assistant Examiner* — Iman Malakooti
(74) *Attorney, Agent, or Firm* — Osha Bergman Watanabe & Burton LLP (57) ABSTRACT

A switch includes: a case including an opening; a cover that covers the opening, is made of an elastomer, and bulges outward from the case; a push rod movably disposed to protrude into the cover from the opening and to retreat through the opening from inside of the cover; a biasing portion that biases the push rod toward the cover from the opening; a fixing contact piece disposed in the case; a movable contact piece that contacts the fixing contact piece, and moves with the push rod inside the case to separate from the fixing contact piece; and a slide contact member disposed on an inner surface of the cover and contacts a tip end of the push rod.

5 Claims, 9 Drawing Sheets

(58) Field of Classification Search
USPC ........................................................ 200/293
See application file for complete search history.

(56) References Cited

U.S. PATENT DOCUMENTS

| 2006/0090991 | A1 | 5/2006 | Shiroshita |
| 2006/0137965 | A1 | 6/2006 | Nishikawa et al. |
| 2009/0173613 | A1 | 7/2009 | Geldmacher |

FOREIGN PATENT DOCUMENTS

| JP | S59-123923 U | 8/1984 |
| JP | H10-144174 A | 5/1998 |
| JP | 2001-35294 A | 2/2001 |
| JP | 2003-146077 A | 5/2003 |
| JP | 2006-100013 A | 4/2006 |
| JP | 2013089336 A | 5/2013 |

OTHER PUBLICATIONS

International Preliminary Report on Patentability issued in corresponding International Application No. PCT/JP2017/036225 dated Dec. 3, 2019 (8 pages).

Office Action issued in corresponding Indian Application No. 201817001724 dated Jan. 24, 2020 (6 pages).

Office Action in counterpart Japanese Patent Appliation No. 2017-554410 dated Aug. 7, 2018 (6 pages).

International Search Report issued in corresponding International Application No. PCT/JP2017/036225 dated Dec. 26, 2017 (5 pages).

Written Opinion of the International Searching Authority issued in corresponding International Application No. PCT/JP2017/036225 dated Dec. 26, 2017 (4 pages).

International Search Report issued in corresponding International Application No. PCT/JP2017/022767 dated Sep. 26, 2017 (6 pages).

Written Opinion of the International Searching Authority issued in corresponding International Application No. PCT/JP2017/022767 dated Sep. 26, 2017 (4 pages).

Office Action issued in corresponding Chinese Patent Application No. 201780003420.7, dated Oct. 8, 2019, with translation (8 pages).

Extended European Search Report issued in the counterpart European Patent Application No. 17823005.8, dated Apr. 7, 2020 (17 pages).

Office Action issued in the counterpart Indonesian Patent Application No. P00201801798, dated Jul. 27, 2020 (6 pages).

\* cited by examiner

SWITCH

TECHNICAL FIELD

The present invention relates to a push type switch that switches between on and off.

BACKGROUND ART

PTL 1 discloses a push button type switch disposed in a knob of a vehicular door.

PTL 2 discloses a switch that turns on and off in association with opening and closing of a vehicular door. The following briefly describes the switch in PTL 2 using reference numerals used in PTL 2 in parentheses. A slide body (5) is housed in a case (1). The slide body (5) is biased by a coiled spring (8). This causes a push rod portion (3a) disposed in the slide body (5) to project from an opening of the case (1). The opening of the case (1) is covered with a dome type rubber cover (7). A tip end of the push rod portion (3a) comes in contact with the rubber cover (7). Closing a vehicular door presses the rubber cover (7) by a door end portion (10) to deform the rubber cover (7) so as to be squashed. The push rod portion (3a) retreats into the case (1) against an elastic force of the coiled spring (8). Since the rubber cover (7) is a rubber material, the rubber cover (7) adheres to both the door end portion (10) and the push rod portion (3a) with an adhesiveness of the rubber cover (7).

CITATION LIST

Patent Literature

[PTL 1] Japanese Unexamined Patent Application Publication No. 2006-100013
[PTL 2] Japanese Unexamined Patent Application Publication No. 2003-146077

SUMMARY OF INVENTION

Figure 9:
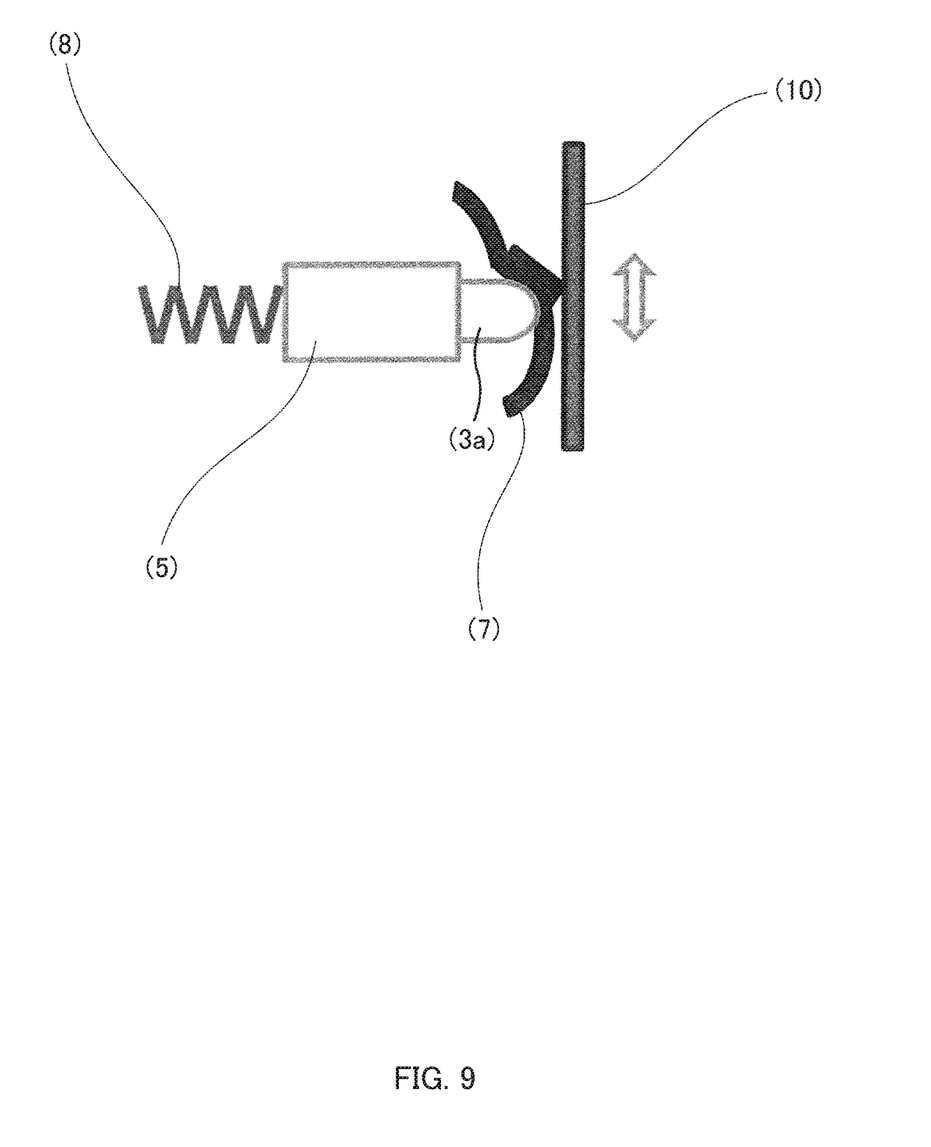
FIG. 9 is an explanatory view of a switch disclosed in a prior art document.

A traveling vehicle causes a vibration in a door with respect to a vehicle body. In view of this, a portion of the rubber cover (7) in contact with the door end portion (10) is displaced following the door end portion (10). On the other hand, a portion of the rubber cover (7) in contact with the push rod portion (3a) is restrained with the push rod portion (3a). In view of this, a large load is applied to the rubber cover (7), and the rubber cover (7) is easily deteriorated. For example, as illustrated in FIG. 9, the push rod portion (3a) is relatively displaced with respect to the rubber cover (7), to develop damage in the rubber cover (7).

One or more embodiments of the present invention relate to a switch that includes a case that includes an opening; a cover that covers the opening, the cover being made of an elastomer and being formed to bulge outward of the case; a push rod movably disposed to proceed into the cover from the opening and to retreat toward the opening from inside of the cover; a biasing portion that biases the push rod in a direction of proceeding into the cover from the opening; a fixing contact piece disposed in the case; a movable contact piece that moves with the push rod in the case to contact and separate from the fixing contact piece; and a slide contact member disposed on an inner surface of the cover, the slide contact member contacting a tip end of the push rod.

As described above, the slide contact member slidingly contact with the push rod. When a contact object vibrates in a state where the contact object presses the push rod with the cover in between against the biasing portion, the cover is displaced so as to follow the contact object. In contrast, the slide contact member slides with respect to the push rod. Accordingly, a large load is less likely to be applied to the cover. Thus, damage of the cover is reduced and a long life of the cover can be achieved.

According to one or more embodiments of the present invention, damage of the cover is reduced and a long life of the cover can be achieved.

DETAILED DESCRIPTION OF EMBODIMENTS

The following describes embodiments of the present invention with reference to the drawings. The embodiments described below include various limitations possible to embody this invention. However, the scope of this invention is not limited to the following embodiments and the examples illustrated in the drawings.

Figure 1:
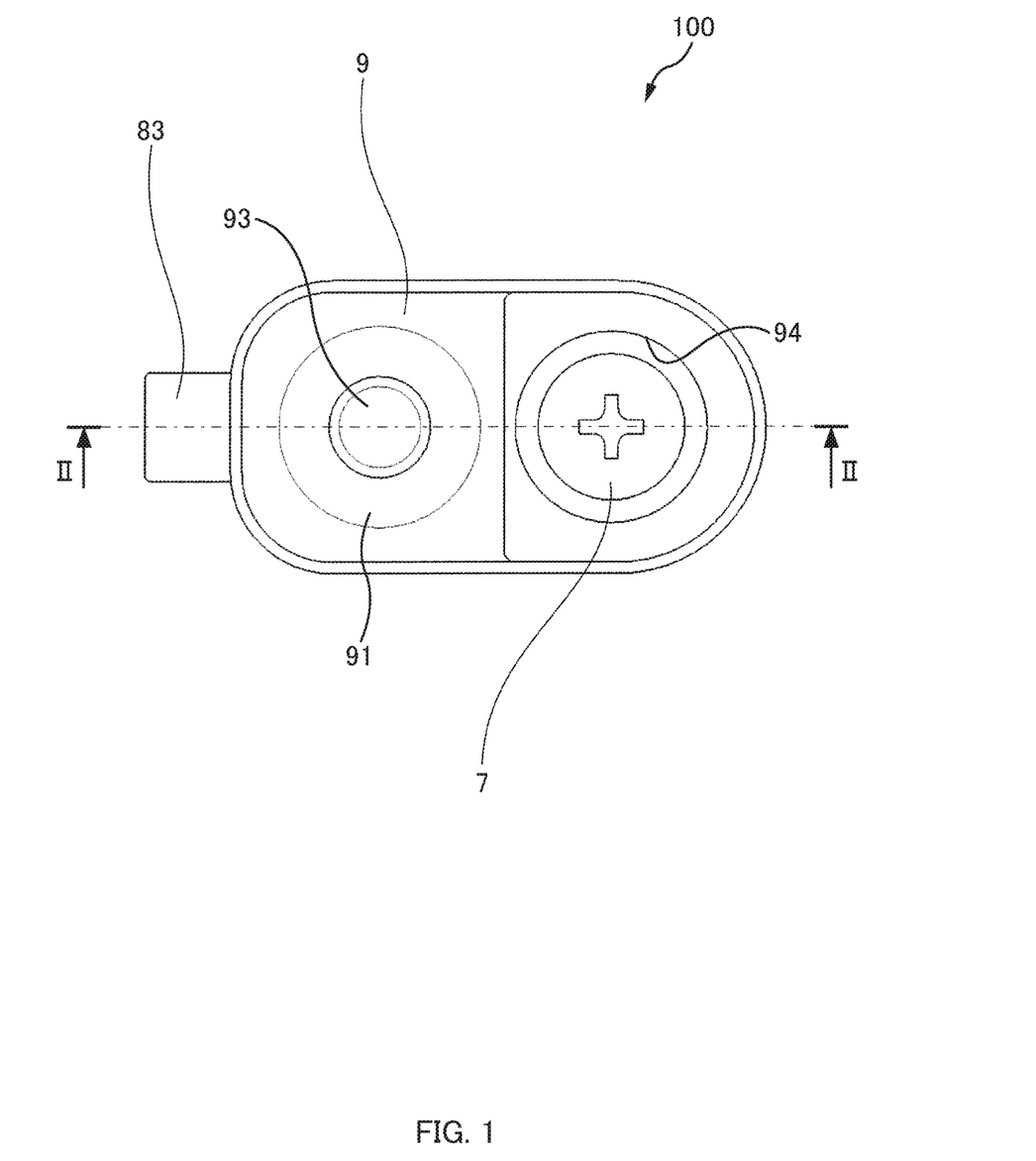
FIG. 1 is a plan view of a switch according to one or more embodiments of the invention.
Figure 2:
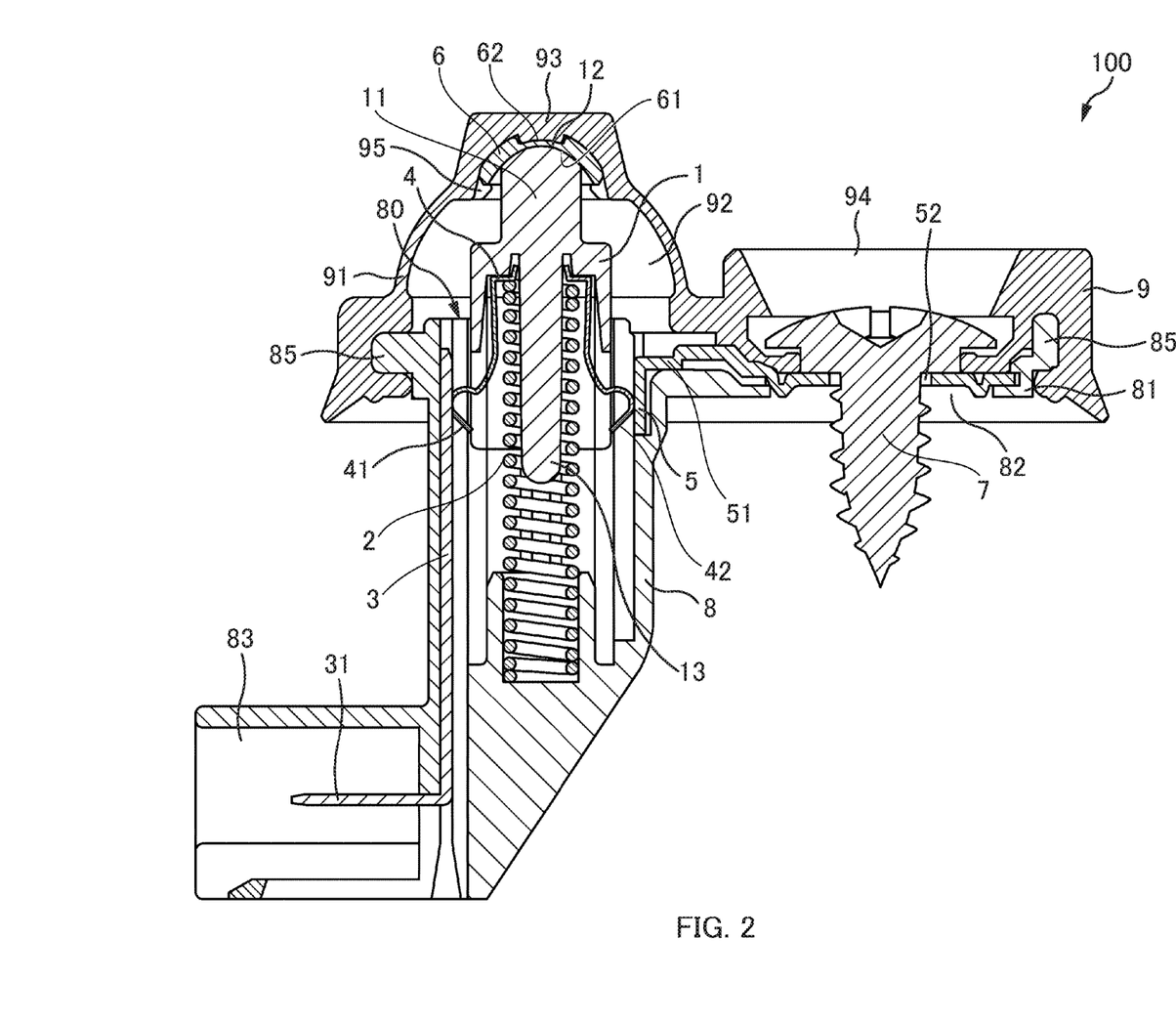
FIG. 2 is a cross-sectional view illustrating a cross-sectional surface taken along a line II-II illustrated in FIG. 1 by viewing in an arrow direction.
Figure 3:
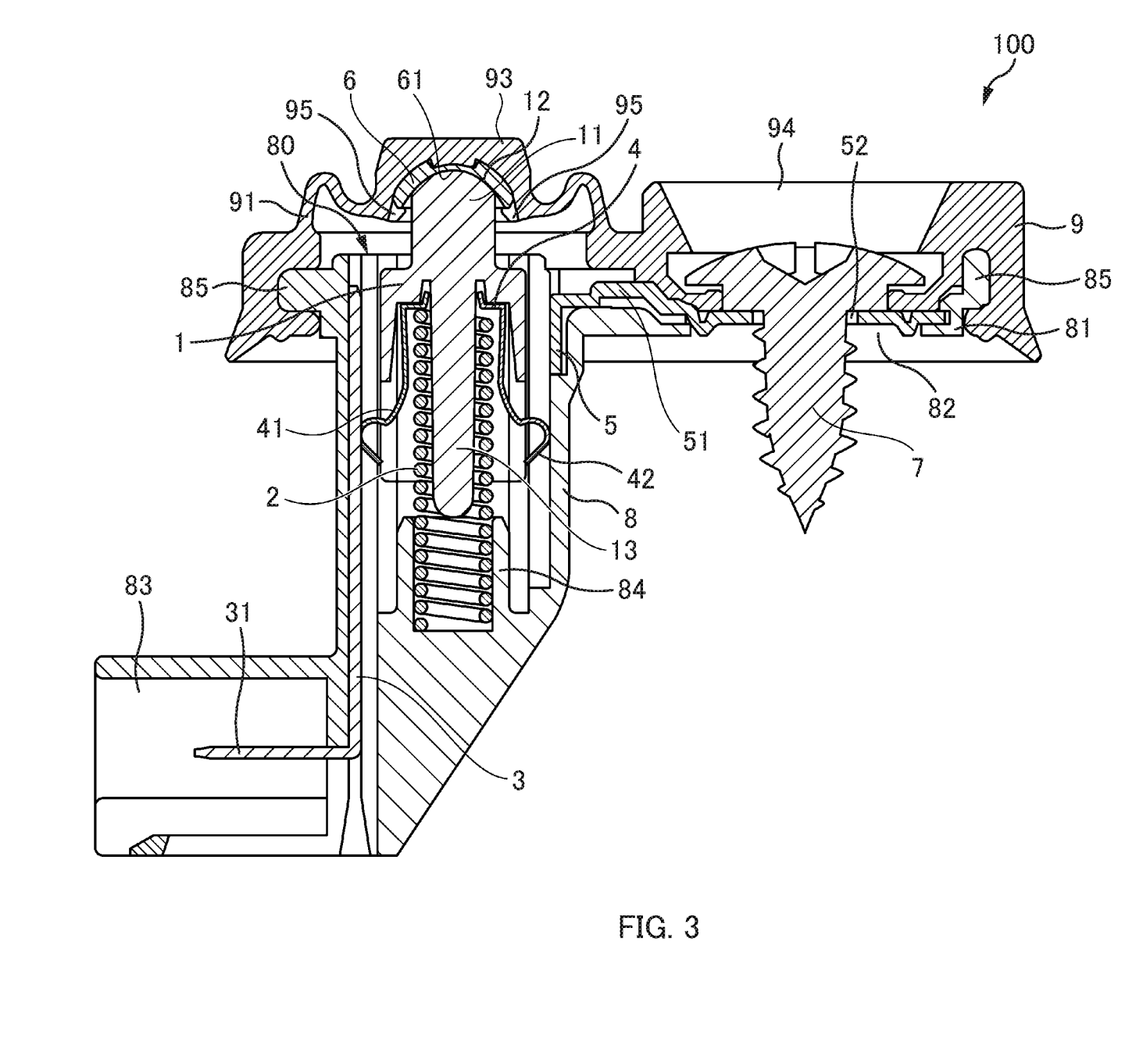
FIG. 3 is a cross-sectional view illustrating the cross-sectional surface taken along a line II-II illustrated in FIG. 1 by viewing in an arrow direction.

FIG. 1 is a plan view of a switch 100. FIG. 2 and FIG. 3 are cross-sectional views of cross-sectional surfaces taken along a line II-II illustrated in FIG. 1.

This switch 100 is a push button switch.

This switch 100 is used for detecting opening and closing of a vehicular door, such as a side door, for example. When the vehicular door is closed, the switch 100 is pressed with the vehicular door as illustrated in FIG. 3, thus turning off the switch 100. On the other hand, when the vehicular door is opened, the pressing of the switch 100 is released as illustrated in FIG. 2, thus turning on the switch 100.

This switch 100 is used for, for example, turning on and off an interior light. When the switch 100 is switched to on, the switch 100 turns on the electricity to the interior light, thus turning on the interior light. On the other hand, when the switch 100 is switched to off, the switch 100 cuts off the electricity to the interior light, thus turning off the interior light.

In the following description, an up and down direction is defined with a direction in which the switch 100 is pressed as downward and a direction in which the pressing of the switch 100 is released as upward. This up and down direction does not necessarily refer to a vertical direction. Accordingly, depending on an installation site or an orientation of the switch 100, the up and down direction possibly becomes a horizontal direction, the vertical direction, and other directions. A vehicle-height direction is the vertical direction, and a vehicle-width direction and a vehicle-length direction are the horizontal direction.

The switch 100 includes a case 8, a bracket 81, a coupling case 83, a slide body 1, a push rod 11, a support shaft 13, a fixing contact piece 3, a movable contact piece 4, a fixing contact piece 5, a coiled spring 2, and a water-proof member 9.

The case 8, the bracket 81, and the coupling case 83 are integrally molded and made of a synthetic resin having an insulating property.

The case 8 is formed into a rectangular tube shape. The case 8 has a center axis line that extends in the up and down direction. The case 8 has an upper end that is open. The case 8 has a lower end that is closed.

The coupling case 83 in a tube shape is disposed to a lower end of a side surface of the case 8. The coupling case 83 is disposed perpendicular to the case 8. The coupling case 83 has a tip end that is open.

The upper end of the case 8 includes the bracket 81. The bracket 81 laterally extends from the upper end of the case 8. The bracket 81 is formed with a hole 82.

On the bracket 81, a terminal plate 51 having a conductive property is installed. The terminal plate 51 is formed with a hole 52. This hole 52 is concentrically disposed with the hole 82 of the bracket 81. Since the hole 52 of the terminal plate 51 has a diameter smaller than that of the hole 82 of the bracket 81, a part of the terminal plate 51 protrudes to an inner side from an edge of the hole 82 of the bracket 81. A peripheral portion of the hole 52 in the terminal plate 51 contacts a vehicle body through the hole 82 of the bracket 81. The terminal plate 51 is fastened to the vehicle body with a screw 7. That is, the screw 7 is passed through the hole 52 and the screw 7 is fastened to the vehicle body, to cause the terminal plate 51 to be interposed between a head of the screw 7 and the vehicle body. This electrically couples the terminal plate 51 to the vehicle body to cause grounding and installs the switch 100 onto the vehicle body. The screw 7 may electrically couple the terminal plate 51 to the vehicle body without the terminal plate 51 contacting the vehicle body.

The terminal plate 51 reaches the upper end of the case 8 on the bracket 81. The fixing contact piece 5 as an end portion of the terminal plate 51 is folded into the case 8. The fixing contact piece 5 is installed in an upper portion of an inner surface of the case 8.

The fixing contact piece 3 having a conductive property is installed to the inner surface of the case 8. The fixing contact piece 3 is disposed in an opposite side of the fixing contact piece 5 with respect to a center line of the case 8. The fixing contact piece 3 and the fixing contact piece 5 are apart from one another. The fixing contact piece 3 extends in the up and down direction along the inner surface of the case 8 and penetrates a bottom portion of the case 8. A lower end of the fixing contact piece 3 is a terminal 31. The terminal 31 is folded into the coupling case 83. When the coupling case 83 is fitted to a housing of a connector, the terminal 31 is coupled to a terminal of the connector.

The slide body 1 having an electrical insulating property is fitted into the case 8. The slide body 1 has an outer surface that contacts the inner surface of the case 8. The slide body 1 is guided in the up and down direction with the inner surface of the case 8. The slide body 1 has a top surface that includes the push rod 11 having an electrical insulating property in a standing state. This push rod 11 protrudes to an upper side of an opening 80 in the upper end of the case 8. The slide body 1 has a lower surface that includes the support shaft 13 that is thinner than the push rod 11 and has an electrical insulating property in a standing state. This support shaft 13 is inserted into the case 8 in a state of separating from the inner surface of the case 8. The support shaft 13 and the push rod 11 are coaxially disposed. The slide body 1, the push rod 11, and the support shaft 13 are integrally molded. Accordingly, the push rod 11 and the support shaft 13 move in the up and down direction in conjunction with the slide body 1. When the slide body 1 moves upward, the push rod 11 proceeds upward from the opening 80 of the case 8. When the slide body 1 moves downward, the push rod 11 retreats toward the opening 80 of the case 8.

The slide body 1, the push rod 11, and the support shaft 13 are made of the synthetic resin. In particular, the slide body 1, the push rod 11, and the support shaft 13 are made of a polyacetal having wear resistance, heat resistance, and a self-lubrication property. The slide body 1, the push rod 11, and the support shaft 13 may be made of any synthetic resin including polycarbonate resin, polyamide resin, ABS resin, polyamide-imide resin, polyether ether ketone resin, polyether-imide resin, polyphenylene sulfide resin, and polypropylene resin.

The coiled spring 2 is disposed around the support shaft 13 so as to be wound around the support shaft 13. The coiled spring 2 is supported with the support shaft 13 and buckling of the coiled spring 2 is suppressed. A bottom portion inside the case 8 includes a seat portion 84 in a tube shape. The coiled spring 2 is held in the seat portion 84. The coiled spring 2 is interposed between the lower surface of the slide body 1 and the bottom portion in the case 8 in a compressed state. The coiled spring 2 is a biasing portion. The slide body 1 is biased upward by an elastic force of the coiled spring 2. In a state where the push rod 11 protrudes upward from the opening 80 of the case 8 as illustrated in FIG. 2, a protrusion formed on the side surface of the slide body 1 comes in contact with a stopper formed on the inner surface of the case 8, and the stopper receives the elastic force of the coiled spring 2. This prevents the slide body 1 from upwardly coming out of the case 8.

The lower surface of the slide body 1 includes the movable contact piece 4 having a conductive property. The movable contact piece 4 is drilled with a bore. By inserting the support shaft 13 into the bore, the movable contact piece 4 is supported with the support shaft 13. The movable contact piece 4 is disposed to extend downward from the lower surface of the slide body 1 and bifurcates to both sides of the support shaft 13. The movable contact piece 4 has one side branch portion that is a contacting terminal 41 contacting the fixing contact piece 3. The movable contact piece 4 has another side branch portion that is a contacting terminal 42 contacting the fixing contact piece 5. The contacting terminal 41 is a leaf spring. The contacting terminal 41 is elastically deformed and pressed against the fixing contact piece 3. Similarly, the contacting terminal 42 is elastically deformed and pressed against the fixing contact piece 5.

The movable contact piece 4 moves up and down in conjunction with the slide body 1, the push rod 11, and the support shaft 13. This causes the movable contact piece 4 to contact and separate from the fixing contact piece 5 but keeps the movable contact piece 4 and the fixing contact piece 3 in a mutually contacting state. Specifically, closing the vehicular door causes the vehicular door to press a tip end 12 of the push rod 11 downward as illustrated in FIG. 3. Thus, the slide body 1 moves downward against the elastic force of the coiled spring 2. Then, while the contacting terminal 41 is kept in contact with the fixing contact piece 3, the contacting terminal 42 separates downward from the fixing contact piece 5. Thus, the fixing contact piece 3 is electrically disconnected from the fixing contact piece 5. On the other hand, opening the vehicular door releases the pressing of the push rod 11 as illustrated in FIG. 2, thus moving the slide body 1 upward by the elastic force of the coiled spring 2. This brings the contacting terminal 42 in contact with the fixing contact piece 5. Thus, the movable contact piece 4 electrically couples the fixing contact piece 3 to the fixing contact piece 5.

The case 8, the bracket 81, and the terminal plate 51 are covered with the flexible water-proof member 9 from above. Here, a flange 85 is formed in a peripheral edge portion of the case 8 and the bracket 81. Fitting the flange 85 in a groove formed in an edge inside the water-proof member 9 ensures a water stop property. The water-proof member 9 is made of an elastomer, and is made of, for example, thermoplastic or thermosetting synthetic rubber. Here, the elastomer means a high-polymer material having rubber elasticity. A concept of the elastomer encompasses a rubber, the synthetic rubber, a natural rubber, a vulcanized rubber, the thermoplastic elastomer and the thermosetting elastomer, and the like. The rubber, the synthetic rubber, the natural rubber, the vulcanized rubber, the thermoplastic elastomer, and the thermosetting elastomer are also kinds of the elastomer. An elastic modulus, that is, the Young's modulus, of the elastomer is sufficiently low compared with that of, such as, a metal, the synthetic resin, or a glass. The rubber elasticity means a property that has an elastic modulus sufficiently lower than that of, such as, the metal, the synthetic resin, or the glass and largely deforms easily.

A portion of the water-proof member 9 that overlaps the hole 82 of the terminal plate 51 is formed with a hole 94. A portion 91 of the water-proof member 9 that covers the opening 80 in the upper end of the case 8 bulges out in a dome shape or a hemispherical shape. Inside the portion 91, a cavity 92 is formed. The push rod 11 is housed in this cavity 92. This portion 91 is hereinafter referred to as a "cover 91."

Figure 4:
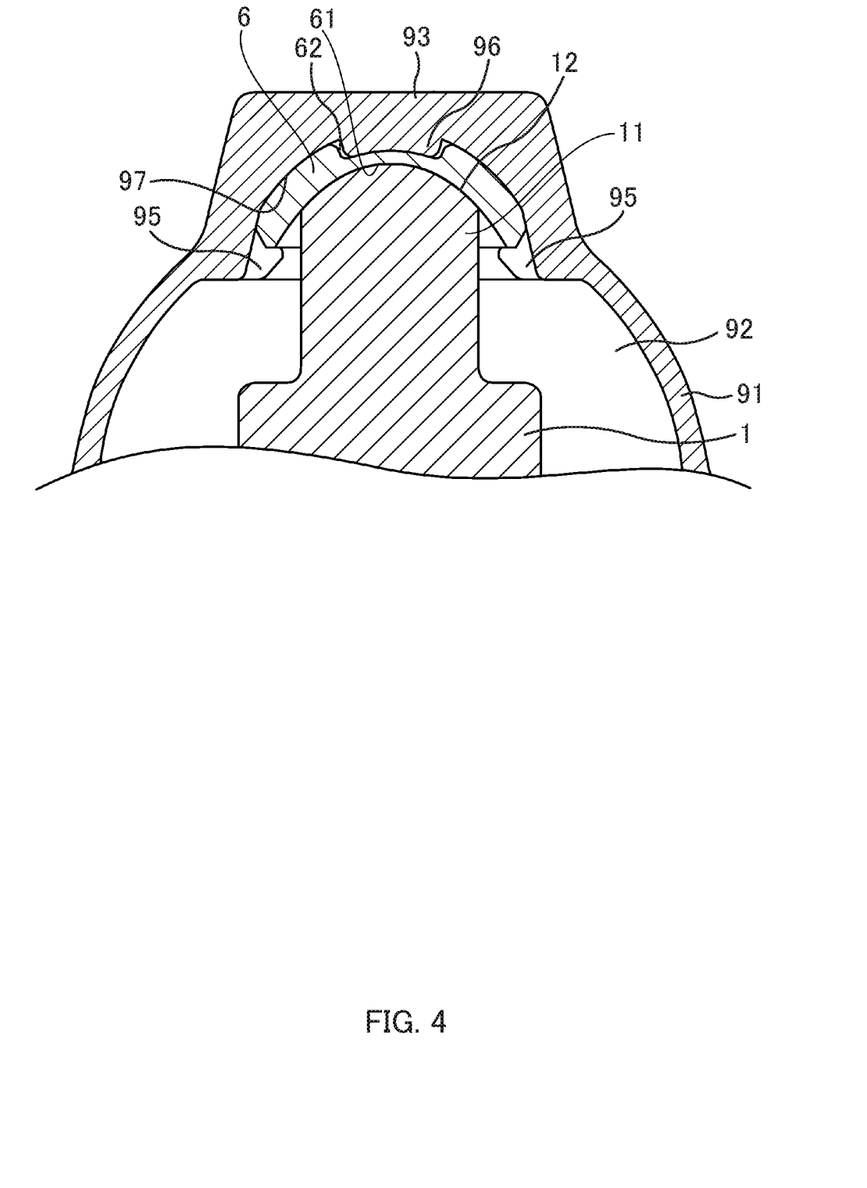
FIG. 4 is an enlarged cross-sectional view of a cover, a sliding member, a push rod, and a similar portion according to one or more embodiments of the invention.
Figure 5:
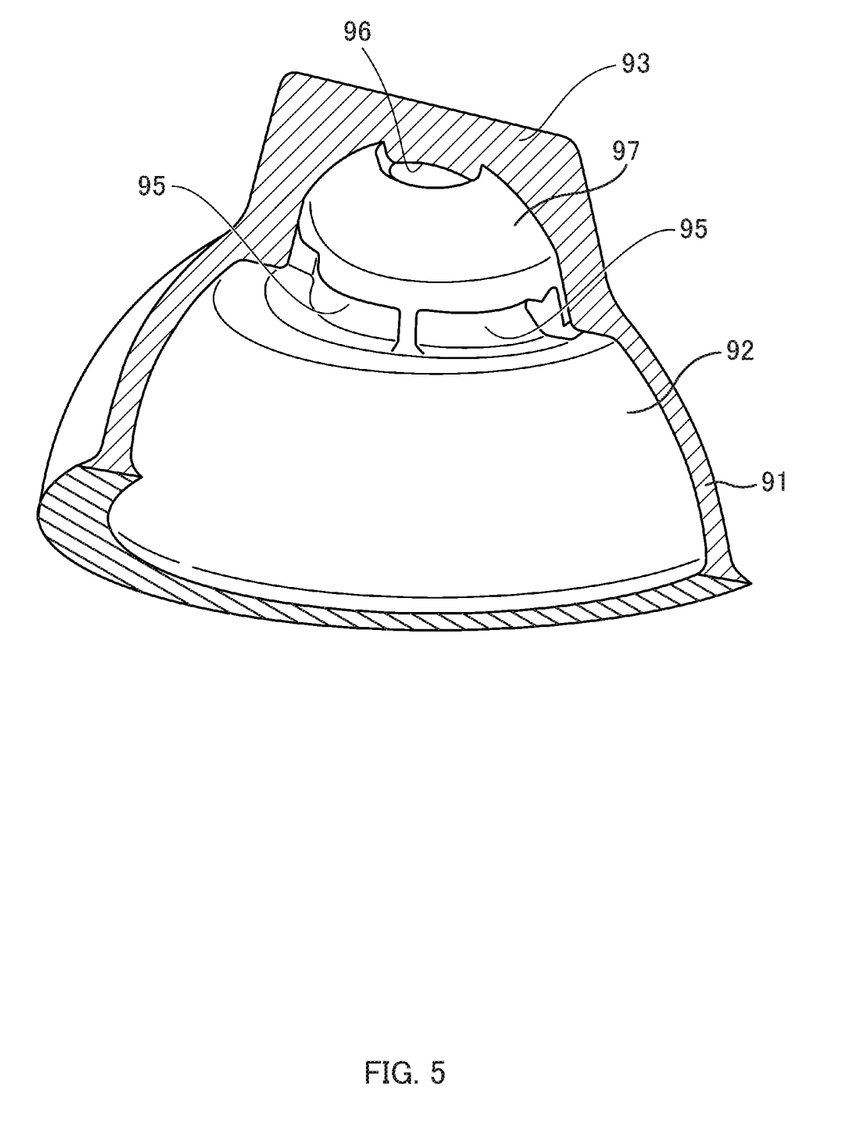
FIG. 5 is a perspective view illustrating a cover in a cut state according to one or more embodiments of the invention.
Figure 6:
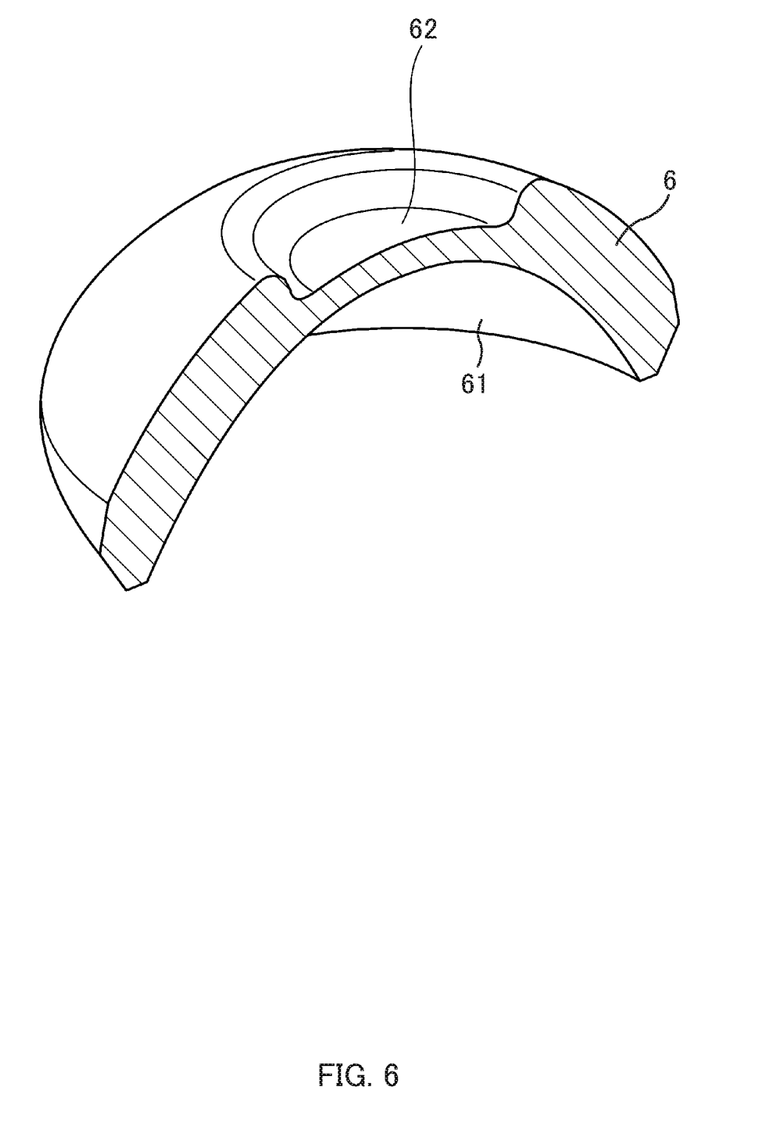
FIG. 6 is a perspective view illustrating a sliding member in a cut state according to one or more embodiments of the invention.

FIG. 4 is an enlarged cross-sectional view of such as the cover 91 illustrated in FIG. 2. FIG. 5 is a perspective view illustrating the cover 91 in a cut state. As illustrated in FIG. 2, FIG. 4, and FIG. 5, the cover 91 has a vertex portion 93 formed into a raised state. The vertex portion 93 has a top surface formed to be flat. A back side of the vertex portion 93 that is an inner surface of the cover 91 is formed with a housing concave portion 97. A slide contact member 6 is fitted in the housing concave portion 97. The housing concave portion 97 has an inner surface that is in surface contact with the slide contact member 6. The housing concave portion 97 has an edge that is formed with lock portions 95 that project inward. The lock portion 95 engages with the slide contact member 6. This restricts the slide contact member 6 from dropping off of the housing concave portion 97.

The inner surface of the housing concave portion 97 is formed with a convex portion 96. On the other hand, the slide contact member 6 has a top surface that is formed with a concave portion 62. Fitting the convex portion 96 to the concave portion 62 prevents the slide contact member 6 from moving along the inner surface of the housing concave portion 97.

The housing concave portion 97 is disposed in a position facing the tip end 12 of the push rod 11. The slide contact member 6 contacts the tip end 12 of the push rod 11. The slide contact member 6 has a lower surface 61, that is, a surface in contact with the tip end 12 of the push rod 11 is formed in a concave curved surface shape, particularly in a concave spherical surface shape. The tip end 12 of the push rod 11 is formed in a convex curved surface shape, particularly in a convex spherical surface shape. A curvature of the tip end 12 of the push rod 11 and a curvature of the lower surface 61 of the slide contact member 6 are equal. The tip end 12 of the push rod 11 is in surface contact with the lower surface 61 of the slide contact member 6.

The slide contact member 6 is made of a self-lubricating material. In particular, the slide contact member 6 is made of the polyacetal that has wear resistance, heat resistance, and self-lubrication property. In the case where both the slide contact member 6 and the push rod 11 are made of the self-lubricating material, a contact surface between the slide contact member 6 and the push rod 11 has a low friction coefficient. Thus, the slide contact member 6 easily slides with respect to the push rod 11.

The friction coefficient on the contact surface between the slide contact member 6 and the push rod 11 is lower than a friction coefficient on a contact surface between the push rod 11 and the cover 91 supposing that the push rod 11 contacts the cover 91. This is because, while a friction in combination with adhesion is generated on the contact surface between the push rod 11 and the cover 91, an adhesion friction is not generated on the contact surface between the slide contact member 6 and the push rod 11.

The cover 91 is made of an elastomer, for example, synthetic rubber. On the other hand, the slide contact member 6 is made of the polyacetal. Thus, the elastic modulus of the slide contact member 6 is sufficiently higher than the elastic modulus of the cover 91. Accordingly, the slide contact member 6 can be regarded as a rigid body. Thus, the slide contact member 6 is less likely to slide with respect to the cover 91, but easily slides with respect to the push rod 11.

When the vehicular door is closed, the top surface of the vertex portion 93 of the cover 91 is in surface contact with the vehicular door and the cover 91 is pressed and squashed as illustrated in FIG. 3. This moves the push rod 11, the slide body 1, the support shaft 13, and the movable contact piece 4 downward, thus electrically disconnecting the fixing contact piece 3 from the fixing contact piece 5.

Such as traveling of a vehicle causes vibration in a vehicular door, in a state where the vehicular door is closed. Then, the vertex portion 93 of the cover 91 vibrates following the vehicular door. In association with this, the slide contact member 6 slides with respect to the push rod 11. Thus, the push rod 11 does not abrade the cover 91. Furthermore, the push rod 11 does not inhibit the vibration of the vertex portion 93 of the cover 91, thus making it difficult to generate a large local load on the cover 91. Accordingly, along life of the cover 91 can be achieved and a durability of the switch 100 is high.

The convex portion 96 has a property that keeps a constant volume even in deformation, that is, incompressibility. Thus, when the convex portion 96 is compressed with the push rod 11 in an axial direction of the push rod 11, the convex portion 96 deforms so as to expand in a direction perpendicular to the axis. Then, the convex portion 96 is strongly fitted to the concave portion 62. Accordingly, even when the vertex portion 93 of the cover 91 deforms following the vibration of the vehicular door, the slide contact member 6 can be inhibited from dropping off from the housing concave portion 97.

When the vehicular door is opened, the cover 91 is restored into the dome shape or the hemispherical shape. At this time, the push rod 11, the slide body 1, the support shaft 13, and the movable contact piece 4 move upward and the movable contact piece 4 electrically couples the fixing contact piece 3 to the fixing contact piece 5.

The following describes a modification in which a change of design is made to above-described one or more embodiments. Each of changes described below may be applied alone or in combination.

In the above-described embodiments, the slide contact member 6 is made of the polyacetal from the aspect of wear resistance, heat resistance, and self-lubrication property. In contrast, the slide contact member 6 may be made of other synthetic resin including the polycarbonate resin, the polyamide resin, the ABS resin, the polyamide-imide resin, the polyether ether ketone resin, the polyether-imide resin, the polyphenylene sulfide resin, and the polypropylene resin. Even when the slide contact member 6 is made of such synthetic resin, it is sufficiently more effective than the case where the tip end of the push rod 11 directly contacts the cover 91.

In the above-described embodiments, the convex portion 96 is formed on the inner surface of the cover 91, the concave portion 62 is formed in the slide contact member 6, and the convex portion 96 is fitted to the concave portion 62. In contrast, a concave portion may be formed on the inner surface of the cover 91, a convex portion may be formed in the slide contact member 6, and the convex portion may be fitted to the concave portion.

Figure 7:
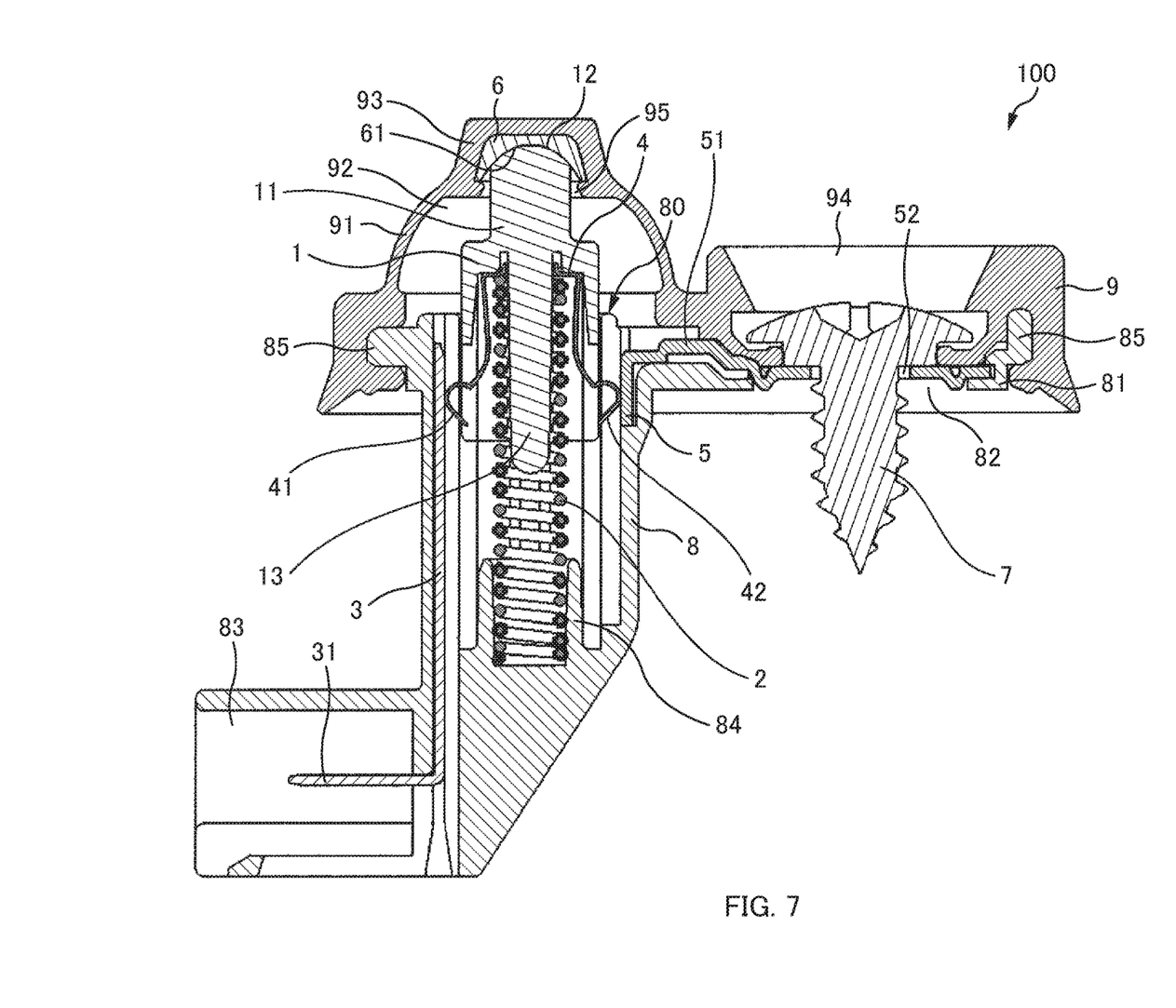
FIG. 7 is a cross-sectional view of a switch in a modification according to one or more embodiments of the invention.
Figure 8:
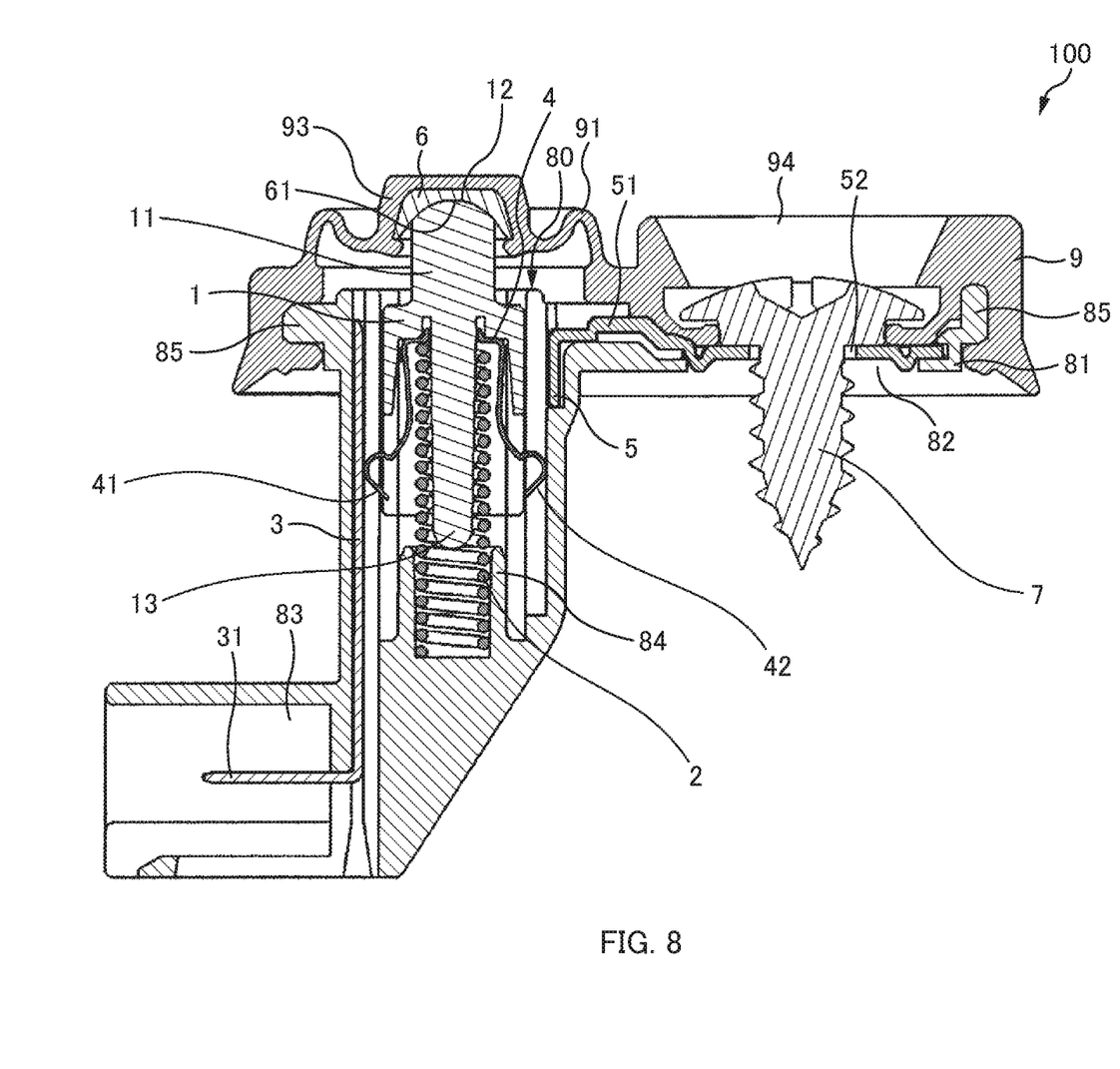
FIG. 8 is a cross-sectional view of when a switch in a modification is pressed down according to one or more embodiments of the invention.

As illustrated in FIG. 7 and FIG. 8, the convex portion is not necessarily formed on the inner surface of the cover 91 and the concave portion is not necessarily formed in the slide contact member 6.

A configuration to embody the present invention has been described in accordance with one or more embodiments. The above-described description is to facilitate understanding of the present invention and is not for interpreting the present invention in a limiting sense. It is apparent for those skilled in the art that the embodiments of the present invention can be modified and improved without departing from the gist of the present invention.

The present application claims priority from Japanese Patent Application No. 2017-106586 filed on May 30, 2017. The entire content of which is herein incorporated by reference.

INDUSTRIAL APPLICABILITY

As described above, the switch of one or more embodiments has durability, thus being effective in a field of a transport apparatus, such as a vehicle.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

2 coiled spring (biasing portion)
8 case
4 movable contact piece
5 fixing contact piece
6 slide contact member
11 push rod
80 opening
91 cover
100 switch

The invention claimed is:

1. A switch comprising:
    a case comprising an opening;
    a cover that covers the opening, is made of an elastomer, and bulges outward from the case;
    a push rod movably disposed to protrude into the cover from the opening and to retreat through the opening from inside of the cover;
    a biasing portion that biases the push rod toward the cover from the opening;
    a fixing contact piece disposed in the case;
    a movable contact piece that contacts the fixing contact piece, wherein
       the movable contact piece moves with the push rod inside the case to separate from the fixing contact piece; and
    a slide contact member disposed on an inner surface of the cover and contacts a tip end of the push rod, wherein
       the slide contact member is disposed between the inner surface and the tip end, and
       the slide contact member is a rigid body.

2. The switch according to claim 1, wherein the slide contact member is made of a synthetic resin.

3. The switch according to claim 1, wherein the slide contact member is made of a polyacetal.

4. The switch according to claim 1, wherein:
    the tip end of the push rod has a convex curved surface shape, and
    a surface of the slide contact member that contacts the tip end of the push rod has a concave curved surface shape.

5. The switch according to claim 1, wherein:
    a convex portion is disposed on one of the inner surface of the cover and the slide contact member,
    a concave portion is disposed on the other of the inner surface of the cover and the slide contact member, and
    the convex portion is fitted to the concave portion.

\* \* \* \* \*